July 11, 1939.   H. A. LUBS ET AL   2,165,493
MANUFACTURE OF SULPHUR COLORS
Filed Aug. 25, 1937
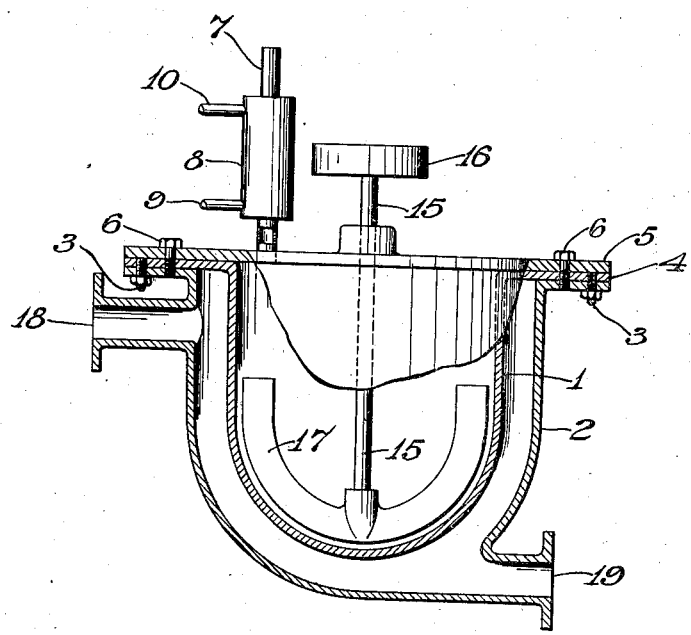
Herbert A. Lubs
George Clifford Strouse   INVENTORS
BY Walter C. Wheeler
ATTORNEY.

Patented July 11, 1939

2,165,493

UNITED STATES PATENT OFFICE 2,165,493

MANUFACTURE OF SULPHUR COLORS

Herbert A. Lubs, Wilmington, Del., and George Clifford Strouse, East Aurora, N. Y., assignors to E. I. du Pont de Nemours & Company, Wilmington, Del., a corporation of Delaware Application August 25, 1937, Serial No. 160,826

2 Claims. (Cl. 260—128)

This invention relates to the thionating of organic dyes and especially to improved devices for thionating sulphur dyes and to improvements in the processes of thionation.

Heretofore iron reaction vessels were commonly used in the preparation of dyes involving thionating reactions. In such thionations the material to be thionated was heated in a water-containing reaction mass with an alkali metal sulphide or polysulphide, and sometimes with a solvent, such as glycerine. In making sulphur dyes, for example a material such as a hydroxy-diarylamine is heated in a reaction mass containing sodium polysulphide, glycerine and water at temperatures of approximately 120° C. for 72 hours whilst agitating the charge and refluxing the evaporated material. In such thionations a considerable amount of iron of the vessel reacted with the sulphide and costly depreciation of the apparatus ensued. After a number of thionations had been made in an iron vessel the action of the sulphur compounds reached a minimum but some deterioration of the vessel was always present. When the vessel was new or had been out of use and exposed to the air for a short time a number of thionations had to be carried out in order to condition the vessel. Until the pot was conditioned the deterioration of the pot was more rapid and the reaction mass contained large amounts of iron. The dyes from such conditioning charges were inferior and if an attempt were made to improve such dyes the operation was often difficult and uneconomical. As a consequence iron thionation vessels deteriorated relatively rapidly and considerable amounts of materials had to be used in conditioning the apparatus. Improved apparatus was desired to avoid these disadvantages.

It is among the objects of this invention to provide improved apparatus for thionating organic compounds. Another object of the invention is to provide economies in the thionation of dyes and improved processes for making the dyes. Other objects of the invention will be apparent from the following description.

The objects of the invention are attained generally by providing thionation apparatus having thionation vessels constructed of an iron alloy, the principal alloy constituents of which are chromium and nickel.

It has been found that the iron-chromium-nickel alloys containing about 18% chromium, about 8% nickel, about 0.05 to about 0.3% carbon, not over about 1.0% manganese and the remainder principaly iron are not deleteriously attacked by thionating reaction mixtures of the kind described, either in continuous use or when they are first put into operation.

The strength of this alloy is much greater than cast iron and it was found that the vessels could be made in thinner gauges than could be tolerated with iron vessels. Consequently the heating of the thionation mixture which can be done by direct heat but is more satisfactorily accomplished by heating the reaction vessel by indirect heat, such as steam, hot flue gas or a heated oil bath was brought to reaction temperature and cooled more rapidly than could be done in the thicker more bulky vessels which were composed of iron or those which were lined with lead.

A marked improvement in the use of the stainless steel vessels was found in the quality of the dye produced. By comparison of samples of dye which were made in the same way in a seasoned iron vessel, in a lead lined vessel, and in the above described iron alloy vessel, the dye made in a stainless steel vessel was brighter in shade.

In the sole figure of the drawing an elevational, partial cross sectional view of a thionation device illustrative of the invention is shown.

The flanged reaction vessel 1 which is composed of an alloy containing 18% chromium, about 8% nickel, about 0.05 to about 0.3% carbon, not over about 1.0% manganese and the remainder iron is secured to an enclosing flanged vessel 2 by stud bolts 3. The touching portions of the flanges are faced and a suitable gasket can be used if desired to form a tight joint. The upper surface of the flange 4 is faced to form a tight joint with a cover 5 which is tightly secured by set screws 6.

The cover 5 is provided with a reflux condenser 7 having communication with the upper space of the vessel 1. The reflux condenser may desirably be jacketed with a jacket 8 which is supplied with a cooling medium, such as water through inlet pipe 9, and it discharges the cooling medium through outlet pipe 10. It is also desirable but not always necessary to provide means for agitating the reaction mixture. For this purpose a propeller shaft 15 is mounted to be turned in the cover 5 through a driven member, such as the pulley 16. Any suitable propeller, such as the agitator 17 is mounted on the lower end of the shaft 15. The vessel 2 having its walls spaced from vessel 1 to form a chamber for heating fluid is provided with an inlet 18 for steam, hot flue gases or the like, and the assembly is supported on brickwork or another suitable support which is not shown.

The invention is further illustrated by the following examples:

Example 1

1100 grams of sodium sulfide crystals, 536 g. of sulfur, 200 g. of 3-hydroxy-6-amino-7-methyl-phenazine and 100 g. of glycerine were put in a stainless steel pot equipped with an agitator and reflux condenser. The mixture was refluxed at 117° C. for 17½ hours. Then the charge was diluted and the dye precipitated by aeration. The reddish brown dye obtained in this way was brighter than that made in an iron pot by a similar procedure.

Example 2

225 grams of "Cellosolve", 142.5 of p-hydroxy-phenyl-b-naphthylamine, 7.5 g. of p-aminophenol, 125 g. of sodium sulfide 60% and 215 g. of ground sulphur were charged into a cold stainless steel pot. The charge was heated to boiling and refluxed 12 hours. Then it was diluted to 3 liters and the dye precipitated from the hot solution by adding sodium bisulfite solution until the mixture was neutral to Brilliant Yellow test paper. The dye was filtered off, washed and dried. The black dye obtained in this manner was noticeably brighter than that made in a similar manner in an iron pot.

Example 3

100 grams of "Cellosolve", 269 g. of p-hydroxy-diphenyl-amine (37.2% paste), 492 g. of sulphur, 80 g. of sodium carbonate and 231 g. of sodium hydroxide were charged into a stainless steel thionator and heated to boiling under a reflux condenser. 147 grams of water were added to reduce the boiling point to 116° C. Reflux the charge for 72 hrs. Then dilute it to about 3 liters, heat to 80–85° C. and precipitate the dye by aeration. The reddish brown dye prepared in this way is brighter than when made by a similar process in an iron pot.

Example 4

Charge into a stainless steel pot 200 g. of "Cellosolve", 100 g. of ethyl-carbazole leucoindophenol, 184 g. of ground sulphur, 77 g. of caustic soda flakes and 15 g. of water. Reflux the charge at 125–120° C. for 24 hours. Then add 103 g. of 30% caustic soda solution, dilute 2 liters and filter off the dye at 80° C. Wash the dye with 7% salt solution until free of polysulfide. The blue dye obtained is brighter than was obtained by a similar process using an iron pot.

Example 5

An alcoholic sodium polysulfide solution was prepared by heating 600 cc. of alcohol, 154 g. of caustic soda flakes and 369 g. of sulphur in a stainless steel pot until the reaction was finished. Then the indophenol obtained by oxidizing together 71.2 g. of p-amino-phenyl-morpholine and 37.6 g. of phenol was stirred into the polysulfide solution. The charge was refluxed for 96 hours at 82.5° C. Then 500 cc. of water and a few drops of Cutwell oil were added and the alcohol distilled off. The dye was diluted, treated with 1000 g. of sodium sulfite crystals to remove excess sulphur and precipitated by aeration. The blue sulphur color made in this way is brighter than when made similarly in a lead or iron pot.

The invention is applicable to thionations of organic compounds in which the reaction mixture contains mono- and poly-hydroxy water soluble alcohols and their water soluble esters and ethers, alkali metal polysulphides and water where the reaction mixture is subjected to refluxing, and it is particularly applicable to the thionation of dyes and dye intermediates involving such reaction media. The preparation of various thionated dyes and the advantages attained have been described but it is to be understood that the advantages are attained generally in thionating dyes.

The term "stainless steel" as used in the specification and claims refers to the alloys containing principally iron, chromium and nickel which are hereinbefore more particularly described.

As it is evident that the invention is capable of various modifications which can be made without departing from the invention, no limitations are intended in the annexed claims except those which are specifically recited or are imposed by the prior art.

We claim:

1. In the process of manufacturing a thionated dye by heating an indophenol in a reaction mixture having a boiling point higher than 100° C. and containing an alkali metal poly-sulphide, water and a water soluble solvent from the group consisting of mono- and poly-hydroxy alcohols, their esters and ethers, the step which comprises heating said reaction mixture and agitating the same in a container in which at least the parts in contact with the reaction mixture consist of an alloy of about 18% chromium, about 8% nickel, about 0.05% to about 0.3% carbon, not over 1.0% manganese and the remainder mainly iron.

2. In the process of manufacturing a thionated dye by heating an indophenol in a reaction mixture having a boiling point higher than 100° C. and containing an alkali metal poly-sulphide, water and a water soluble solvent from the group consisting of mono- and poly-hydroxy alcohols, their esters and ethers, the steps which comprise heating said reaction mixture to the boiling point thereof in a container consisting of an alloy of about 18% chromium, about 8% nickel, about 0.05% to about 0.3% carbon, not over 1.0% manganese and the remainder mainly iron, agitating and refluxing the reaction mixture until the thionation is completed.

HERBERT A. LUBS.
GEORGE CLIFFORD STROUSE.